Nov. 3, 1964     E. J. KLEBER, JR., ETAL     3,154,839
BANDSAW BLADE
Filed July 26, 1961
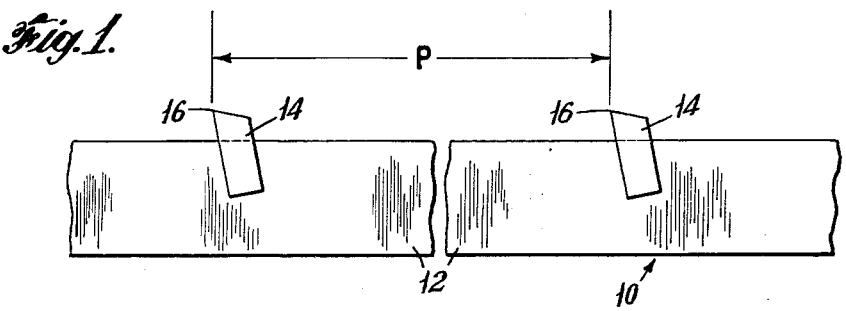
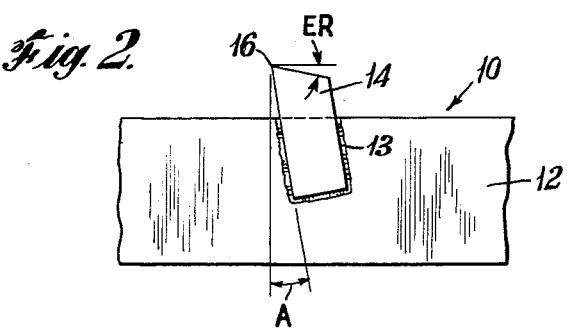
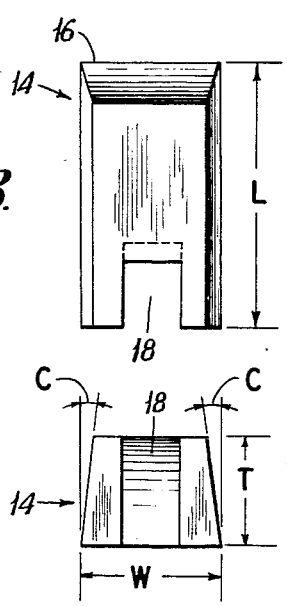
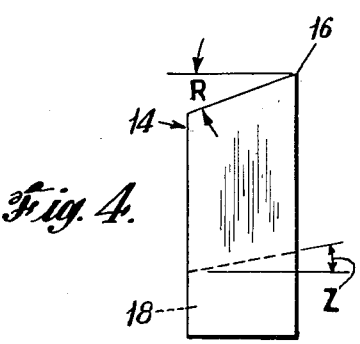
INVENTORS
EDWARD J. KLEBER, JR.
EDWARD R. MAJKA
BY
ATTORNEY United States Patent Office 3,154,839
Patented Nov. 3, 1964

3,154,839
BANDSAW BLADE
Edward J. Kleber, Jr., and Edward R. Majka, Niagara Falls, N.Y., assignors to Union Carbide Corporation, a corporation of New York
Filed July 26, 1961, Ser. No. 127,042
2 Claims. (Cl. 29—95)

This invention relates to saw blades and refers specifically to blades of the bandsaw type for use in the cutting of non-ferrous materials including particularly graphite.

Conventional band type cutting saw blades are provided with a number of cutting teeth which are inserted or ground directly into the bandsaw blade in such a manner that they appear one immediately behind the other with no appreciable space separating them. As these blades pass through the material which is being cut, each individual tooth cuts a layer of the material and also clears away any chips or dust present on the cutting surface.

If a non-ferrous material such as aluminum, asbestos, or plastic is to be cut, the best results are obtained by using a conventional bandsaw which is provided with a coarse pitch. The pitch defines the number of teeth per blade inch and may vary between 2 and 25. The coarser pitch facilitates chip and dust removal during the cutting of such materials as mentioned above. This coarser pitch is exemplified by a buttress or skip tooth blade wherein alternate teeth are omitted completely.

Unfortunately, if such conventional blades are employed for the cutting of graphite, serious disadvantages are encountered. For example, finely divided graphite powder or dust is produced when the graphite is cut. Since the powder or dust generally is of a size insufficient to form chips which might peel and free themselves from the blade, as is customarily the case when cutting most ferrous metals such as steel, each tooth of the blade has a tendency to become accumulated with substantial quantities of the powder or dust. The teeth of conventional blades thus carry the graphite powder or dust through the work and the blade has a tendency to slide rather than cut. In addition, this accumulation of powder or dust is further detrimental inasmuch as it renders the blade unstable in the cut causing it to "wobble" as it passes through the work producing an extremely uneven cut.

The cutting of materials such as graphite is further plagued by the relative hardness of the materials. Repeated usage in the cutting of these materials has conclusively shown that conventional blades having cutting teeth usually of high tempered steel, exhibit a very short cutting life and accordingly fall far short of practical usage. It has been found for example that when cutting graphite of an average stock size, the teeth of conventional blades wear exceedingly fast, rendering the blade useless in most instances after only a few cuts. Also, a factor believed to be a cause of blade wear is the above-noted "wandering action" of the blade as a result of its teeth becoming accumulated with powder or dust of the material, such action leaving an uneven surface, considered neither economical nor acceptable.

From an economic standpoint, it is readily seen that for cutting graphite, even when a coarse or buttress type of pitch is resorted to, the results are highly impractical. When considered alone and apart from the cost of the blades themselves, the time consumed by an operator required for changing a blade after a failure adds substantially to the expense incurred in using conventional blades.

It is therefore an object of this invention to provide a new and novel construction for a cutting blade of the bandsaw type which overcomes the above disadvantages, and the use of which is economically practicable.

Another object of the invention is the provision of such a bandsaw blade having teeth of extremely hard material inserted in a readily flexible blade which will exhibit an enhanced cutting life over heretofore known blades.

Still another object of the invention is to provide a bandsaw blade which will prohibit the accumulation on the blade of finely-divided powder or dust resulting from such cutting.

A further object of the invention is to provide a bandsaw blade which restricts itself to vertical linear cutting thereby prohibiting wobbling and wandering of the blade in the work.

The above objects are achieved by a new and novel construction for a bandsaw blade which utilizes teeth of hard material, preferably sintered carbide, a critical tooth pitch, and critical back rake and end relief angles.

In the drawing:
FIG. 1 is a broken side elevational view of a bandsaw blade embodying the novel features of the invention;
FIG. 2 is a side elevational view of a portion of the blade shown in FIG. 1 showing one tooth embodying the invention;
FIG. 3 is a front elevational view of the tooth shown in FIG. 2;
FIG. 4 is an end elevational view of the tooth of FIG. 2; and
FIG. 5 is a bottom view of FIG. 3.

Referring to the drawings and particularly FIG. 1, the bandsaw blade 10 of the invention consists of a band 12 provided with a plurality of equi-spaced cutting teeth 14. These teeth 14 are suitably secured to the band 12 by solder 13 as shown in FIG. 2.

The band 12 is preferably made of a highly flexible steel and may be of standard bandsaw width and thickness.

Each tooth 14, has a sharp, forward cutting edge 16 which is provided by relieving the top of the tooth 14 at an end relief angle R of between about 25 degrees to 35 degrees. The preferred end relief angle R is approximately 30 degrees.

The lower surface of each tooth is provided with a slot 18 of a width approximately the width of the band 12. As best seen in FIGS. 3 and 4, this slot is provided at an angle Z of approximately 10 degrees. When the teeth 14 are secured to the band 12 the angle Z automatically provides each tooth with a back rake angle A of the same magnitude, i.e. approximately 10 degrees.

As can be seen in FIG. 2, the interaction between angles A and R will result in an effective end relief angle E.R. of between about 15 degrees and about 25 degrees, and preferably 20 degrees.

Clearance angles C shown in FIG. 5, are conventionally provided on bandsaw blade teeth. For best results, the angles C should be about 5 degrees.

In further accordance with the limitations of the invention, the teeth 14 are spaced on the band 12 at distant intervals defining a "tooth pitch," generally designated by the letter P in FIG. 1, which tooth pitch is substantially larger than that heretofore found in cutting blades.

It has been found that the minimum satisfactory tooth pitch or successive tooth spacing for the bandsaw blade of the invention is about 4 inches. Factors governing the particular tooth spacing to be used, include the operating linear speed of the bandsaw and the cross section or through dimension of the work to be cut. Graphite pieces to be cut may vary from a fraction of an inch to 100 inches and speeds employed usually are in the range of from 500 to 5000 surface feet per minute.

For example, when cutting average size graphite stock to a particular length, say a block 16 by 16 inches square by 72 inches long, an optimum bandsaw speed is about 550 surface feet per minute. The proper tooth pitch for such speed has been found to be from about 4 inches to 12 inches. When cutting the same stock at high speeds of about 5000 surface feet per minute, an increased tooth pitch of between about 12 inches and 22 inches is preferred. Generally speaking, at any given bandsaw speed, the preferred tooth pitch P varies directly in excess of 4 inches with the size of the piece which is to be cut. Since there is no limit on the size piece which may be cut, a definite preferred tooth pitch cannot be stated; but, it can easily be determined through trial and error techniques.

This tooth pitch, employing an unconventionally large space between successive teeth, has been found to increase the cutting action and the cutting life of the saw blade many fold.

Another feature of this type of blade is the discovery that the cutting edges of hard metal teeth and particularly teeth of sintered carbides are kept sharp longer by using a substantially increased tooth pitch or space between teeth, as contrasted with the pitch of conventional blades. This effect is due to the fact that sintered carbide tools or cutting edges, if allowed to bite into, rather than abrade away an amount of material, will remain substantially sharper than if the cutting edge of the teeth were to take a cut of a much lesser degree. Thus, in the cutting blade of the invention, this property of sintered carbide materials is advantageously employed by requiring the teeth of the blade to be spaced at substantially large tooth pitches, thereby making each tooth cut larger sections of the work.

In an example of the invention, a standard 1¼ inch wide 19 gage steel bandsaw blade was mounted with sintered carbide teeth which were in accordance with the critical limitations of the invention and the tooth pitch was 12 inches.

The bandsaw blade thus constructed was tested by cutting 2 inch wide slabs from a graphite block measuring 16 by 16 inches square by 72 inches long; the blade exhibited a useful cutting life of 160 cuts. As a poor comparison with this, a standard bandsaw blade 1¼ inches wide and employing a sabre type tooth with a 3 pitch when subjected to the same conditions, had a life of only 4 cuts before failure. This represents an increased life ratio of bandsaw blades of the invention of 40 to 1 over conventional bandsaw blades.

Another advantage gained is improved cutting speeds or rate of advancement of a blade into the work, permissible with the cutting blade of the invention. In further tests using the conventional type bandsaw blade referred to above for cutting graphite stock 16 by 16 inches square by 72 inches long, the blade showed an average advancement into the work of 4 inches per minute. In comparison, the above bandsaw blade of the invention averaged an advancement of over 16 inches per minute into the work under the same conditions.

This application is a continuation-in-part of U.S. Serial No. 746,389, by E. J. Kleber, Jr. and E. R. Majka, filed July 3, 1958 and now abandoned.

We claim:

1. A bandsaw blade for cutting large carbon-graphite stock material comprising a thin, flexible, metallic strip, at least one edge of which has joined thereto an equally spaced series of teeth formed of a hard material, each of said teeth having a sharpened cutting edge protruding above the edge of, and being wider than said metallic strip, said teeth being secured on said blade so as to present an effective end relief angle of between about 15 degrees and 25 degrees, said teeth being spaced apart on said metallic strip to provide a tooth pitch of at least about 4 inches and to cut a very thin smooth kerf in said stock material and to substantially eliminate wobbling and wandering of said blade and whereby no powder or dust of said stock material is accumulated in the kerf of said stock material during the cutting thereof.

2. A bandsaw blade essentially as described in claim 1 wherein said teeth are of sintered carbide, said tooth pitch is at least 12 inches and said effective end relief angle is about 20 degrees.

References Cited in the file of this patent

UNITED STATES PATENTS

| 144,317 | Cotterell | Nov. 4, 1873 |
| 608,703 | Murphy | Aug. 9, 1898 |
| 659,348 | Mercer | Oct. 9, 1900 |
| 1,137,731 | Aheam | May 4, 1915 |
| 2,442,153 | Van Der Pyl | May 25, 1948 |
| 2,480,942 | Lundquist | Sept. 6, 1949 |
| 2,829,632 | Blum | Apr. 8, 1958 |

FOREIGN PATENTS

| 705,133 | France | Mar. 31, 1931 |
| 607,662 | Great Britain | Sept. 2, 1948 |

OTHER REFERENCES

Article—from the May 1958 issue of Coal Age Magazine entitled "New Bit Designs Contribute to Lower-Cost Coal Cutting," pages 108–110.